United States Patent
Bapat

(10) Patent No.: US 10,862,847 B2
(45) Date of Patent: Dec. 8, 2020

(54) SELECTIVE DELAY OF SOCIAL CONTENT SHARING

(71) Applicant: Google LLC, Mountain View, CA (US)

(72) Inventor: Shashank Ashok Bapat, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 123 days.

(21) Appl. No.: 14/841,630

(22) Filed: Aug. 31, 2015

(65) Prior Publication Data

US 2017/0063772 A1    Mar. 2, 2017

(51) Int. Cl.
| | |
|---|---|
| H04L 12/58 | (2006.01) |
| H04L 29/08 | (2006.01) |
| G06Q 10/10 | (2012.01) |
| G06Q 50/00 | (2012.01) |
| G06F 21/60 | (2013.01) |
| H04L 29/06 | (2006.01) |

(52) U.S. Cl.
CPC ............ H04L 51/32 (2013.01); G06F 21/604 (2013.01); G06Q 10/10 (2013.01); G06Q 50/01 (2013.01); H04L 51/26 (2013.01); H04L 67/306 (2013.01); H04L 63/108 (2013.01)

(58) Field of Classification Search
CPC .... G06Q 10/10; G06Q 30/02; G06Q 30/0257; G06Q 30/0274; G06Q 30/0275; G06Q 30/0209; H04L 29/06; H04L 29/08072; H04L 29/06027; H04L 12/581
USPC ........................................................ 709/204
See application file for complete search history.

(56) References Cited

U.S. PATENT DOCUMENTS

| | | | | |
|---|---|---|---|---|
| 7,752,251 B1 * | 7/2010 | Shuster | ................. | G06F 16/954 709/200 |
| 8,209,266 B2 * | 6/2012 | Wormald | ............... | G06Q 50/01 705/1.1 |
| 9,203,919 B1 * | 12/2015 | Zhu | .......................... | H04L 67/26 |
| 2008/0189380 A1 * | 8/2008 | Bosworth | .............. | G06Q 10/10 709/207 |
| 2009/0013413 A1 * | 1/2009 | Vera | ....................... | G06Q 10/10 726/30 |
| 2010/0217721 A1 * | 8/2010 | Wormald | ............... | G06Q 50/01 705/319 |
| 2012/0198355 A1 * | 8/2012 | Lau | ........................ | G06Q 10/10 715/752 |
| 2013/0066990 A1 * | 3/2013 | Ben-Yoseph | ......... | H04L 51/043 709/206 |

(Continued)

OTHER PUBLICATIONS

S. Bennett, "A Block on Twitter Isn't a Block at All", AllTwitter, Mediabistro.com, Jun. 15, 2009, 4 pages, <http://www.mediabistro.com/alltwitter/blockfail_b5210>.

(Continued)

*Primary Examiner* — Mahran Y Abu Roumi
(74) *Attorney, Agent, or Firm* — Lowenstein Sandler LLP

(57) ABSTRACT

A system and method for selectively delaying social content sharing within social networks are disclosed. In an online social network, content sharing settings provide a time period for which sharing of content of a content type or provided through an online channel is to be disabled. When content of the content type is received for sharing with one or more users, the content is not shared with the users until the time period is expired or the disabling of the sharing is overridden.

18 Claims, 6 Drawing Sheets

(56) References Cited

U.S. PATENT DOCUMENTS

| | | | |
|---|---|---|---|
| 2013/0211888 A1* | 8/2013 | Alwan | G06Q 30/0277 705/14.7 |
| 2013/0346877 A1* | 12/2013 | Borovoy | H04L 65/403 715/753 |
| 2014/0067955 A1* | 3/2014 | Christian | H04L 65/60 709/204 |
| 2014/0129640 A1* | 5/2014 | Ogawa | H04L 67/306 709/204 |
| 2014/0172704 A1* | 6/2014 | Atagun | G06Q 40/02 705/44 |
| 2014/0188992 A1* | 7/2014 | Jayawardane | H04L 65/403 709/204 |
| 2014/0229544 A1* | 8/2014 | Evans | G06Q 50/01 709/204 |
| 2014/0372218 A1* | 12/2014 | Talluri | G06Q 30/0256 705/14.54 |
| 2015/0065098 A1* | 3/2015 | Pfau | G06Q 30/0277 455/414.1 |
| 2015/0156274 A1* | 6/2015 | Alten | G06F 16/16 709/204 |
| 2015/0189392 A1* | 7/2015 | MacRae | H04N 5/44543 725/27 |
| 2015/0193522 A1* | 7/2015 | Choi | G06F 16/285 707/737 |
| 2015/0237464 A1* | 8/2015 | Shumaker | H04L 51/20 709/204 |
| 2015/0304437 A1* | 10/2015 | Vaccari | G06F 16/9537 709/204 |
| 2015/0350351 A1* | 12/2015 | Tung | H04L 67/18 709/204 |
| 2016/0092940 A1* | 3/2016 | Gupta | G06Q 30/0277 705/14.73 |
| 2016/0205105 A1* | 7/2016 | Nainwal | H04L 63/101 726/28 |
| 2017/0039528 A1* | 2/2017 | Becker | G06Q 10/1095 |

OTHER PUBLICATIONS

"SNAP Features: Scheduled and Delayed (Up to 48 Hours) Postings (Pro Only)", NextScripts.com, Viewed Jun. 23, 2014, 6 pages, <http://www.nextscripts.com/snap-features/scheduled-and-delayed-posting/>.

"How Do I Delay Posting an Announcement Until a Specific Date?", Canvas Instructor Guide, Canvas Guides, Guides. Instructure. com, Viewed Jun. 23, 2014, 3 pages, <http://www.guides.instructure.com/m/4152/1/50735-how-do-i-delay-posting-an-announcement-until-a-specific-date>.

A. Ruthruff, "How-To Delay, Defer or Schedule Delivery of Outlook 2010 Email Items", GPost, Groovypost.com, May 19, 2010, 37 pages, <http://www.groovypost.com/howto/microsoft/delay-defer-schedule-delivery-outlook-2010-email/>.

Social Media Management Dashboard—Hootsuite, Hootsuite Media Inc., Hootsuite.com, Viewed Aug. 31, 2015, 5 pages, <https://hootsuite.com>.

* cited by examiner

SELECTIVE DELAY OF SOCIAL CONTENT SHARING

BACKGROUND

The present disclosure relates generally to the sharing of content in social networks. Users are increasingly sharing content, such as videos, images, posts and other content available online.

SUMMARY

The subject technology provides a system and computer-implemented method for selectively delaying social content sharing within social networks. In one or more implementations, a computer-implemented method comprises identifying one or more entities in an online social group, receiving, from a user interface, a user selection of one or more social content sharing settings for the one or more identified entities, identifying one or more content items to be shared with the one or more identified entities, determining, based on the received one or more social content sharing settings, a time period for which sharing of the one or more content items with the one or more entities is to be prevented, preventing the sharing of the one or more content items with the one or more entities for the determined time period, and sharing the one or more content items with the one or more entities when the determined time period has expired. Other aspects include corresponding systems, apparatuses, and computer program products for implementation of the computer-implemented method.

In some aspects, the one or more entities may comprise one or more users of an online social network, and the one or more content items may comprise an endorsement of user-provided content associated with an activity stream of the online social network, with a display of the endorsement to the one or more users being delayed until the determined time period expires. In some aspects, the one or more entities may comprise one or more users of an online social network, and the one or more content items may comprise a user-provided message associated with an activity stream of the online social network, with a display of the user-provided message to the one or more users being delayed until the determined time period expires.

In some aspects, the computer-implemented method may further comprise providing, during the determined time period, a visual indication that content shared with the one or more entities will not be seen by the one or more entities, the visual indication being provided in connection with a representation of the one or more entities within the user interface. In some implementations, the computer-implemented method further comprises providing, to the user interface, a notification that the one or more content items are being prevented from being shared, receiving, from the user interface, a user-initiated command to share the one or more content items before the time period expires, and sharing, in response to the user-initiated command, the one or more content items before the time period expires.

In some aspects, the computer-implemented method may further comprise posting the one or more content items to a webpage associated with the user account, and allowing access to the one or more content items by the one or more entities, via the webpage while the sharing is prevented during the determined time period.

In some aspects, the computer-implemented method may further comprise determining one or more notification settings associated with the user account, and selectively providing notifications associated with the one or more entities to the user account based on the notification settings while the sharing is prevented during the determined time period. In some aspects, the social content sharing settings may comprise one or more online social channels for which content sharing with the one or more entities is to be prevented, and preventing the sharing of the one or more content items comprises preventing, for the one or more entities, the sharing of the one or more content items through the one or more online social channels for the determined time period while allowing the one or more content items to be shared with the one or more entities through other online social channels.

In some aspects, the user selection may be associated with a first user account in an online social network, and the online social group may be representative of a social graph of relationships between the user account and other user accounts in the online social network, the other user accounts comprising the one or more entities In one or more implementations, a computer-implemented method comprises receiving, from a user interface, a user selection of one or more social content sharing settings for one or more user accounts in an online social group, the social content sharing settings comprising one or more online social channels for which content sharing with the one or more user accounts is to be disabled, receiving one or more content items for sharing with the one or more user accounts through the one or more online social channels, and disabling, for the one or more user accounts, the sharing of the one or more content items with the one or more user accounts through the one or more online social channels for a predetermined time period while allowing other content items to be shared with the one or more user accounts through other online social channels. Other aspects include corresponding systems, apparatuses, and computer program products for implementation of the computer-implemented method.

In some aspects, the online social channels may include one or more of an online channel for receiving notifications or an online social activity stream. The one or more social channels may comprise an activity stream associated with the one or more user accounts, and the one or more content items may comprise a user-provided message for the activity stream, a display of the user-provided message being delayed for the one or more user accounts until the predetermined time period expires. The one or more social channels may comprise an activity stream associated with the one or more user accounts, and the one or more content items may comprise an endorsement of user-provided content in the activity stream, a display of the endorsement being delayed for the one or more user accounts until the predetermined time period expires.

In some aspects, the computer-implemented method may further comprise providing, during the determined time period, a visual indication that content shared with the one or more entities through the one or more social channels will not be seen by the one or more entities, the visual indication being provided in connection with a representation of the one or more user accounts within the user interface. In some aspects, the computer-implemented method may further comprise providing, to the user interface, a notification that the one or more content items are being prevented from being shared, receiving, from the user interface, a user-initiated command to share the one or more content items before the predetermined time period expires, and sharing, in response to the user-initiated command, the one or more content items through the one or more social channels before the time period expires.

In some aspects, the computer-implemented method may further comprise determining one or more notification settings associated with the user account, and selectively providing, based on the one or more notification settings, notifications related to the sharing of the one or more content items to a user account that provided the one or more content items for sharing with the one or more user accounts while the sharing is prevented during the predetermined time period.

In one or more implementations, a computer-implemented method comprises receiving, from a user interface, a user selection of one or more social content sharing settings for one or more user accounts in an online social group, the social content sharing settings comprising a predetermined content type for which content sharing with the one or more user accounts is to be disabled, receiving one or more content items of the predetermined content type for sharing with the one or more user accounts, and disabling, for the one or more user accounts, the sharing of the one or more content items with the one or more user accounts for a predetermined time period while allowing other content items of a different content type to be shared with the one or more user accounts. Other aspects include corresponding systems, apparatuses, and computer program products for implementation of the computer-implemented method.

In some aspects, the user selection may be associated with a first user account in an online social network, and the online social group may be representative of a social graph of relationships between the user account and the one or more user accounts. In some aspects, the predetermined content type may be one of an endorsement, an article, or a user message. In some aspects, the social content sharing settings may comprise one or more online social channels for which content sharing with the one or more user accounts is to be disabled, and disabling the sharing of the one or more content items may comprise preventing, for the one or more user accounts, the sharing of the one or more content items through the one or more online social channels for the predetermined time period while allowing the one or more content items to be shared with the one or more user accounts through other online social channels.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

DETAILED DESCRIPTION

Figure 1:
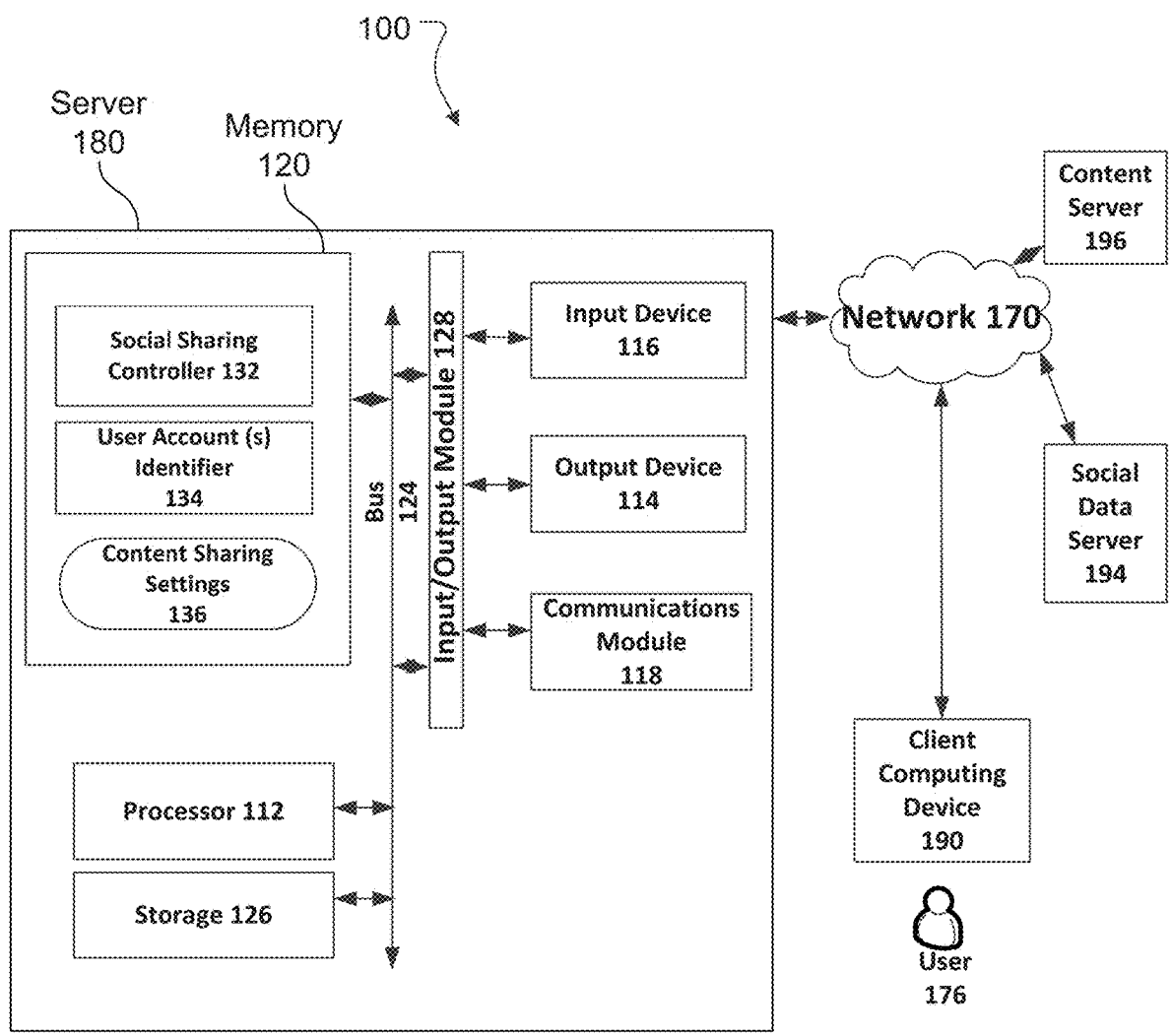
FIG. 1 is a diagram depicting an example electronic system for use in connection with selectively delaying social content sharing within social networks.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

An online social network may allow a user to share social activity with other users within the social network. The user may, e.g., post or share social activity, including social content items (e.g., posts, articles, messages, notifications, endorsements, etc.), within the online social network, and the content items may then be viewed by user's social contacts. Social activity includes anything a user may do in a social network including, e.g., the sharing, endorsing, and viewing of content within the social network, e.g., within a social group. For the purpose of this disclosure, the social group may include, e.g., a social graph representative of the many relationships and connections the user has between various other individuals, groups, businesses and other entities within the social network (e.g., the user's social contacts).

When a content item is posted, shared, endorsed, viewed, etc., it may be automatically shared with the user's social contacts via an activity stream or electronic notification. In some cases, the user may not want to share a content item with one or more other users for a variety of personal or professional reasons. The user may "block" or delink the one or more other users from the user's social network to prevent the connections from viewing the content item. However, the blocked users may be blocked from viewing all content items from the user, thereby limiting other desirable interactions and thus degrading the user's social networking experience.

The subject technology includes identifying one or more entities (including, e.g., users, groups, businesses, etc.) in an online social group and receiving (e.g., from the user) one or more social content sharing settings for the one or more identified entities in the online social group. In one example, the user may select one or more icons displayed, e.g., on a user interface of the social networking software application, to select one or more corresponding entities, and select social content sharing settings for one or more of selected entities. The social content sharing settings many indicate one or more time periods for which content items (e.g., posts, notifications, endorsements, etc.) are to be disabled from being viewed by the selected entities. The social content sharing settings may also indicate social channels (e.g., social webpages, activity streams or feeds, etc.) or types of content (e.g., video, images, text etc.) that are to be disabled from being viewed by the selected entities.

In some implementations, the user may delay or defer the sharing of content items with one or more selected entities for a set time period. For example, the user may set a time period (e.g., 20 minutes, 24 hours, 1 week, 1 month, etc.) for which to defer the sharing of the content items. Once the time period has elapsed, sharing of content items with the selected entities may be enabled or resume. In this way, a user need not have to completely block an entity within the user's online social group. Instead, the user may block content items (or, e.g., content notifications) from being shared with selected entities, thus enhancing the user's social experience.

Additionally or in the alternative, the user may set social content sharing settings to temporarily disable the sharing of content items of other users with the user. In this regard, the user may set a time period and select one or more entities for which the user does not wish to receive content items from for the time period. The subject technology may prevent the selected entities from sharing content items with the user for that time period or, when the content items are shared by the selected entities, delay receipt of the content items by the user for the time period.

In one or more implementations, a user has the option to prevent storage of information collected by applications integrated with the online social network, or by the social network itself. The user may also be provided with an opportunity to select which programs or features may collect or share user information. For example, the user may select, by way of user preferences, view what items of information are being collected from the user and disable sharing of one or more of those items for a time period selected by the user.

FIG. 1 is a diagram depicting an example electronic system 100 for use in connection with selectively delaying social content sharing within social networks, according to some implementations of the subject technology. A server 180 includes processor 112, memory 120, storage 126, bus 124, input/output module 128, input device 116, output device 114 and communications module 118. Memory 120 includes social sharing controller 132 and user account(s) identifiers 134. In some implementations, server 180 includes one or more modules for facilitating user interaction via a browser, web application or a special purpose application executing on client computing device 190 for processing data stored in social data server 194. Server 180 may be implemented as a single machine with a single processor, a multi-processor machine, or a server farm including multiple machines with multiple processors. Communication module 118 can enable server 180 to send and receive data over network 170 to social data server 194, content server 196 and client computing device 190.

In some implementations, content server 196 can include data including but not limited to video, audio, text, images or any combination thereof. The data stored at content server 196 may be shared over a social network and provided for display in web browser tabs, web applications or any other web content areas. For example, a video stored at the content server 196 may be streamed to a web application (e.g., mobile social networking application) or browser tab for display to user 176 via client computing device 190. In another example, audio stored at content server 196 may be streamed to the web application or browser tab for playback to user 176 via client computing device 190. In yet another example, a social media post stored at content server 196 may be provided to the web application or browser tab for engagement by user 176 via client computing device 190.

In some implementations, server 180 can be associated with social data server 194 that includes social data and may send and receive data over network 170 to the social data server 194. In some implementations, social data server 194 may store social content item(s) (e.g., posted content item (s)) associated with a social networking service. Social data server 194 may also store data related to user accounts and content items that are associated with the user accounts. For example, social data server 194 can include data indicating content items that have been viewed, posted, shared, commented on or endorsed (e.g., favored or disfavored) by a user account associated with a user. Social data server 194 may also store information identifying different social networking services that are associated with a user account. Social data server 194 may also store information identifying a preferred social networking service associated with the user account.

In some implementations, social data server 194 may also store authentication data (e.g., a username and password) associated with one or more social networking services associated with the user account. Social data server 194 may also store open authentication information that provides client applications executing on client computing device 190 access to server 180's or content server 196's resources on behalf of a resource owner. Open authentication information may specify a process for resource owners to authorize third-party access to their server resources without sharing their credentials. Open authentication may allow access tokens to be issued to third-party clients by a server (e.g., server 180), with the approval of the resource owner, or end-user. The client (e.g., client computing device 190) may then use an access token to access protected resources hosted by the resource server. Open authentication can allow web surfers to log into third-party web sites using their different social networking accounts. Social data server 194 may store a social connection data structure that is indicative of social connections between user accounts associated with the social networking service. Social data server 194 may also store user comments made (or annotations) towards content consumed by the user and stored at content server 196.

In some implementations, content server 196, social data server 194, client computing device 190 and server 180 can communicate with one another via network 170. Network 170 may include the Internet, an intranet, a local area network, a wide area network, a wired network, a wireless network, or a virtual private network (VPN). While only one content server 196, social data server 194, client computing device 190 and server 180 are depicted, the subject technology may be implemented in conjunction with any number of content servers 196, social data servers 194, client computing device 190 and servers 180. In some non-limiting implementations, a single computing device may implement the functions of content server 196, social data server 194 and server 180 and other components depicted in FIG. 1.

In some implementations, server 180 may receive web content for display in a web content area of a social networking application. The web content may be received at server 180 from content server 196 when the web content is requested at (or shared with) client computing device 190. For example, content may be requested from content server 196 via a content area (e.g., browser tab) of a web browser or web application executing at client computing device 190. Content server 196 may be configured to provide the content to server 180 that processes the content in accordance with the disclosed implementations. Server 180 may then provide the content in accordance with the disclosed implementations to client computing device 190. In this way, server 180 may act as a proxy server between content server 196 and client computing device 190. In another example, content may be requested from server 180 by a web browser or web application executing at client computing device 190. Server 180 may provide the request to content server 196. Content server 196 may then provide the content in accordance with the disclosed implementations to client computing device 190. In some implementations, content may be requested from content server 196 by a web browser or web application executing at client computing device 190. Content server 196 may then provide the content in accordance with the disclosed implementations to client computing device 190.

Client computing device 190 can be a laptop computer, a desktop computer, a mobile phone, a personal digital assistant (PDA), a tablet computer, a netbook, a television with one or more processors embedded therein or coupled thereto, a physical machine, or a virtual machine. Client computing device 190 may include one or more of a keyboard, a mouse, a display, or a touch screen. Client computing device 190 can include a browser or any web application configured to display webpages or any web content. For example, the browser can display a webpage including multimedia content from content server 196. Alternatively, client computing device 190 may include special-purpose applications (e.g., mobile phone or tablet computer applications) for accessing and displaying content.

As discussed above, memory 120 of server 180 can include social sharing controller 132 and user account(s) identifier 134.

In some implementations, social sharing controller 132 may identify one or more entities in an online social group and receive one or more social content sharing settings for the one or more identified entities in the online social group. Entities may include, online users (e.g., friends, family, acquaintances, and other contacts), groups, businesses, etc. that are associated with the online social network and who may receive social activity-related information within a message stream associated with the account. In some implementations, the one or more entities represent one or more user accounts socially connected to a user account initiating the sharing of the one or more social content items.

In one or more implementations, a user of the social networking software application may, via a user interface, view one or more selectable icons representing respective social contacts and select social content sharing settings 136 for a selected one of the contacts. The social content sharing settings may also indicate social channels (e.g., social webpages, activity streams, blogs, forums, feeds, etc.) or types of content (e.g., video, images, text etc.) that are to be disabled or delayed from being shared with the one or more entities. Thus, some items may be excluded from being shard for a time period while others are shared. In one example, social sharing controller 132 may determine, based on social content sharing settings 136, that real-time chat messages (e.g., instant messages) may be shared between the user and one the one or more identified entities, while other social activity within a message stream are not shared. Additionally or in the alternative, social sharing controller 132 may determine, based on social content sharing settings 136, that file attachments (e.g., documents, images) may be shared between the user and one the one or more identified entities when all other items are not shared.

In some implementations, which content items are shared, e.g., in an activity stream are determined by social sharing controller 132 based on social content sharing settings 136. Social content sharing settings 136 may be selected or input by a user and include a time period (e.g., 24 hours, 1 week, 1 month, etc.) for which sharing of one or more social content items with the one or more entities is to be disabled or delayed. Social sharing controller 132 may disable sharing during the time period, and enable sharing after the time period. In some implementations, social sharing controller 132 may include a timer application that measures or tracks time periods.

In some implementations, content items that are designated to be disabled or delayed from being shared to an entity may be made available to the entity by way of a webpage associated with the user account. In this manner, even though the content items are not visible in a social network stream, the entity may view the content items by navigating to the webpage. Additionally or in the alternative, social sharing controller 132 may, based on one or more notification settings associated with the user account, selectively provide one or more notifications regarding the content items to the entity while sharing of the items is disabled or delayed.

In some implementations, social sharing controller 132 determines whether a social content item includes an identifier addressing a particular entity in the online social group. For example, the identifier may be a username of an account. In some implementations, when social sharing controller 132 determines that the social content item includes or is associated with the identifier, social sharing controller 132 shares the one or more social content items with the particular entity after the disabling. The identifier may include, but is not limited to, a username, an email address, a micro-messaging handle, etc.

Figure 2:
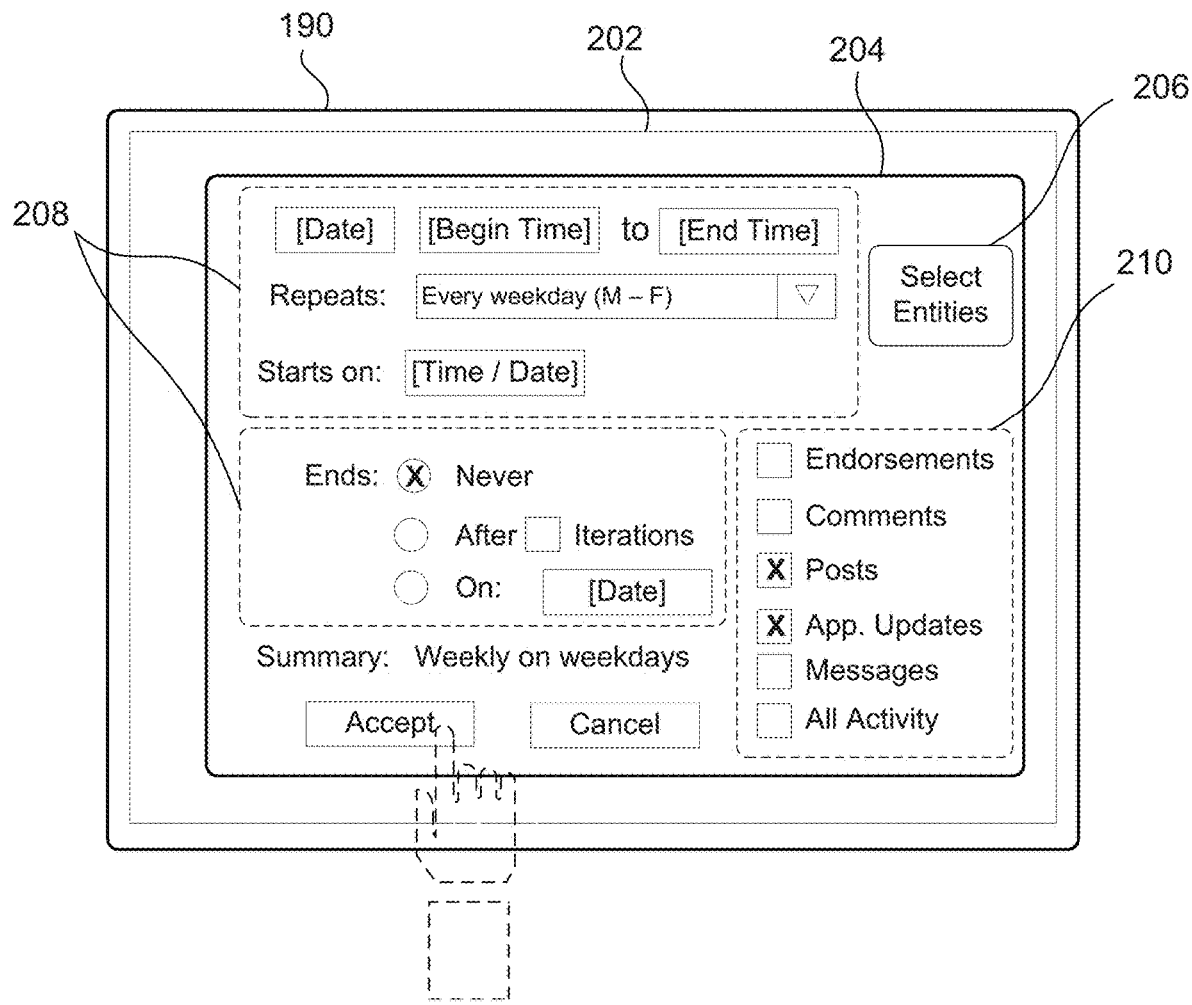
FIG. 2 depicts example computing device, including an example display of a virtual desktop, including a user interface for managing social content sharing settings.

FIG. 2 depicts example computing device 190, including an example display of a virtual desktop 202, including a user interface 204 (e.g., a graphical dialog) for managing social content sharing settings 136. In the depicted example, user interface 204 may be accessible from an icon on virtual desktop 202, or as will be described further with respect to FIG. 3, from a social networking application. Additionally or in the alternative, user interface 204 may be accessible from a settings menu or user profile page. User interface 204 provides for management and selection of a group of social content sharing settings 136, including selection of a time period in which social network activity is to be disabled or delayed.

In one or more implementations, user interface 204 may be used by a user (e.g., user 176) to select one or more entities. For example, control 206 may open a dialog with a list of selectable entities associated with the user. The list of entities may include, e.g., social contacts of the user, or contacts within a predetermined number of degrees from the user in the user's social graph (e.g., first-degree contacts). The user may then select one or more entities to which to which social content sharing settings 136 will be applied. Additionally or in the alternative, user interface 204 may be accessed for a certain entity from the entity's profile page or social content item associated with the entity, and the sharing settings applied to the entity. User interface 204 may be accessed by selecting one or more entities from a list of the user's contacts, and then selecting a control to display user interface 204 for the purpose of setting a group of social content sharing settings 136 pertaining to the selected entities.

Using user interface 204, the user may select one or more time periods 208 in which social activity will be disabled, and select one or more types of social activity 210 to be disabled. The user may enter, e.g., a start date and a duration for the time period. The user may select the time period to end. e.g., on a certain date, after a number of iterations (e.g., occurrences), or on an end date or time. The selected time period(s) 208 and social activity 210 is updated and applied to the selected one or more entities.

Using user interface 204, the user may select from one or more predetermined types of social activity 210, including endorsements, comments, posts, application updates, messages, or all social activity. Selecting endorsements may disable all endorsements (e.g., positive or negative) made by the user from being viewed by the selected one or more entities for the selected time period 208. For example, if endorsements are disabled for a first entity, any endorsements provided to a second entity's activity stream by the user in response to content in the second entity's activity stream may not be viewed by the first entity until the expiration of time period 208. The contents of others may be visible during time period 208. A total endorsement count may be incremented for the user's endorsement even though the user's endorsement may not be seen, or may not be incremented during time period 208.

Selecting comments may disable all comments posted to the user's activity stream or posted in reply to other users from being viewed by the selected one or more entities. For example, if comments are disabled for a first entity, any comments provided to a second entity's activity stream in response to content in the second entity's activity stream may not be viewed by the first entity until the expiration of time period 208.

Selecting posts may disable all messages and other content items posted to an activity stream from being viewed by the selected one or more entities, e.g., in the same manner as endorsements and comments. Selecting application updates may prevent content that would otherwise automatically be posted or provided to the social network on the user's behalf from being made available to the selected one or more entities. Additionally or in the alternative, the user may select the collection of user data as a type of social activity 210. For example, the user may identify, as the one or more entities, one or more applications integrated with the social network. In this regard, control 206 may provide an option to select applications that are, e.g., integrated with the online social network and that collect information from the user. The user may then select an option for the collection of data as the type of activity 210, and set a time period 208 for which the collection of data is to be disabled.

Selecting messages may disable messages designated to be sent to the one or more entities, e.g., through an instant messaging service or by email. The message may be composed and then, instead of being sent, delayed by way of setting social content sharing settings 136 in user interface 204.

The user may use user interface 204 to place social activity of the user on "hold." In this regard, the user may set social content sharing settings 136 to give other users the perception that the user is interacting with the online social network at a different time than the actual time the user is interacting with the social network. For example, the user may perform activity during a first time period and, based on content sharing settings 136, all contacts of the user may perceive that the user is active within the social network application during a second time period defined by social content sharing settings 136, including one or more time periods 208. In one example, the user may want to perform social activity late at night but create the perception that the user is active during the daytime hours. The user may, e.g., hold interactions performed between midnight and 7:00 am, or on weekends, until between 10:00 am and noon and 1:00 pm and 5:00 pm on weekdays. The user may also set social content sharing settings 136 for the benefit of social etiquette. For example, the user may wish to space apart serious messages (e.g., related to deaths or other grievances) from comedic messages (e.g., jokes or responses to jokes).

In one or more implementations, user interface 204 may be used to block one or more entities from sharing content items with the user. If a blocked entity visits a profile or other page associated with the user, or views an activity stream in which the user's content items are posted, the blocked entity will be able to view the content items but will not be able to share social activity with the user, e.g., in response to the content items (e.g., post a reply, endorsement, etc.) until the expiration of time period 208. In one or more implementations, the blocked user may be able to initiate sharing of social activity with the user but will receive a notification that the shared activity or content will not be delivered to the user until the expiration of time period 208. The notification may include, e.g., a visual indication that social activity is being withheld from the user or will not be seen by the user (e.g., a "do not disturb" sign). In one or more implementations, the visual indication may include a representation of time period 208 to inform users when the user may again receive shared social activity.

Accordingly, the subject technology provides various blocking mechanisms for the temporary prevention of sharing content within a social network application. In one or more implementations, the user can initiate a timed block in which an entity is blocked from sharing social activity with the user for a predetermined time period (e.g., a couple days or months). After the time period expires the entity is automatically unblocked and may resume sharing with the user. In one or more implementations, the user may a block in which an entity may be blocked from receiving shared content from the user, but if the entity shares a content item then the user will receive the shared item. If social activity is shared with a social group then the blocked entity, even if in the group, will not receive the shared activity. The entity will not be notified and will not see the shared social activity in the entity's social stream.

In one or more implementations, wherein the entity is blocked from sharing social activity with the user, the entity may be notified that the social activity was not shared or will be delayed and delivered upon the expiration of time period 208. In one or more implementations, blocking may be overridden by an explicit directive included in a message. For example, an entity may be blocked from receiving a user's shared social activity; however, the user may override the blocking by explicitly identifying the entity within the social activity using a predetermined tagging format. Additionally or in the alternative, the user may choose to initiate an instant messaging session with the entity during time period 208, thereby overriding the blocking with regard to the instant messaging session but not as to other social activity provided by the user in the social networking application.

Figure 3:
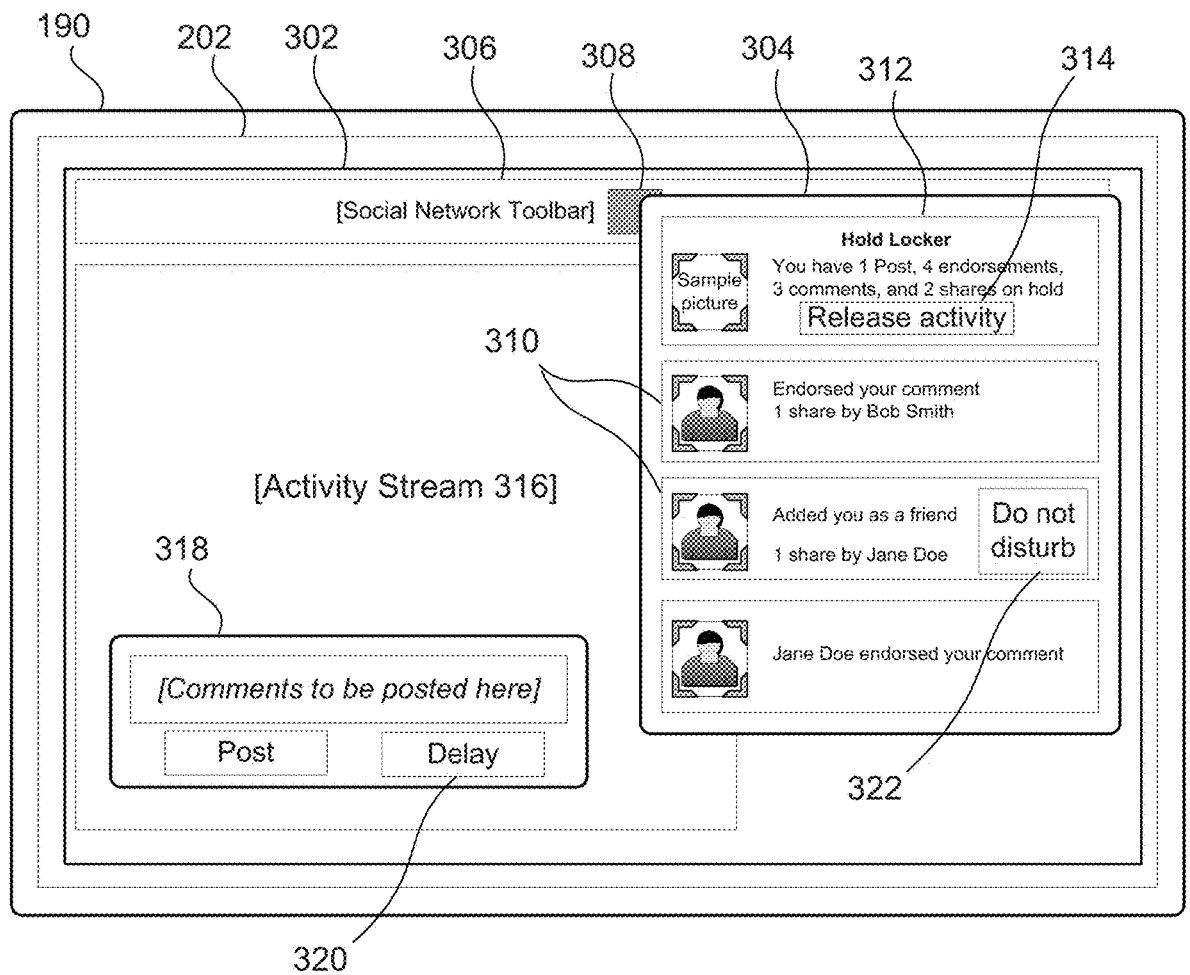
FIG. 3 depicts an example social network application, including an example notification list.

FIG. 3 depicts an example social network application 302, including an example notification list 304, according to one aspect of the subject technology. User social network application 302 may be displayed on a client computing device 190. Accordingly, social network application 302 may be displayed on, e.g., a smartphone, GPS navigation device, or personal computer, tablet computer, PDA, a television or other display device with one or more location-aware computing devices embedded therein or attached thereto, or the like. Social network application 302 may be integrated with an operating system (e.g., as a virtual desktop) or for an application, such as a web browser 308 or a social network application.

Notification list 304 may be accessible from a toolbar 306. For example, toolbar 304 may include a number of virtual buttons and other controls for the manipulation of one or more application features. Toolbar 304 may include a control 308 that, when activated, displays notification list 304, above and at least partially overlapping social network application 302, including, e.g., one or more applications or application features. In some aspects, notification list 304 may float, and may be repositioned by a user. Notification list 304 may be generated, e.g., by instructions provided by the operating system or embedded within an associated application (e.g., scripting language embedded within a webpage).

Notification list 304 may include one or more notifications 310 as graphic elements. Each notification 310 may be generated as a result of a recent activity generated by or within a corresponding application and include, e.g., notification content describing social activity within an activity stream. Additionally or in the alternative, a notification 310 may have been provided to social network application 302 from one or more remote application servers associated with an application on device 190 or integrated with social network application 302. In this manner, notification list 304 may provide a listing of social activities that are of interest to the user. In one or more implementations, each notification 310 may function as a visual link to an application associated with the notification, such that, when activated (e.g., by clicking or tapping on an area of a display screen corresponding to the notification), the user is navigated to an online location (e.g., an activity stream or webpage) associated with the notification.

According to aspects of the subject technology, notification list 304 may include or be associated with a social activity hold notification 312. Hold notification may display one or more representations of social activity associated with the user of social network application 302 that are currently disabled or delayed by way of social content sharing settings 136. For example, each representation displayed in hold notification 312 may be associated with a time period 208 that encompasses a current time.

In one or more implementations, hold notification 312 may include a release activity control 314 that, which activated, overriding (e.g., ending) time period 208 for all social activity currently being disabled from being shared. Accordingly, the user may activate release activity control 314 to make the social activity that was disabled by way of user interface 204 immediately viewable by the one or more entities to which the social activity is being disabled for.

In one or more implementations, notification list 304 may include a notification 310 for each social activity item (e.g., endorsement, post, comment, etc.) placed on hold by the user. A release activity control 314 may be associated with each social activity item, and selection of a respective one of the release activity controls 314 may override time period 208 for the corresponding social activity item, immediately releasing it to be viewed by the one or more entities to which the item is being disabled for. In one or more implementations, activation of release activity control 314, or hold notification 312, may provide the user options to discard all the social activity items so they are never sent or open user interface 204 to adjust settings.

In one or more implementations, when posting to an activity stream 316, a user may be presented with, or activate for display, a comment interface 318 in which the user provides a content item, including a message, file, link, etc. In addition to comment interface 318 providing a control for committing the message to activity stream 316, comment interface may provide a delay control 320. Activation of delay control 320 may cause a display of user interface 204 so that the user may apply a group of social content sharing settings 136 for disabling sharing of the content item for a time period 208 selected within user interface 204. In one or more implementations, social network application 302 may be an email service, and comment interface 318 may be an email composition dialog or other location for composing emails. In this regard, delay control 320 may be used to delay the sending of an email composed using comment interface 318.

In one or more implementations, each time a representation of one of the entities for which content is being disabled is presented to the user, the representation of the entity may be accompanied with a visual indication 322 that one or more types of social activity 208 is being withheld from the entity or will not be seen by the entity. Indication 322 may be displayed in notifications by the entity, with content items posted by the entity, or in the entity's social network profile page. Wherein the user has turned on temporary blocking of social activity of one or more entities, the one or more entities may be provided with an indication 322 corresponding to the user to notify the one or more entities that the user is unavailable for the sharing of social activity or that sharing of social activity will not be delivered to the user.

Figure 4:
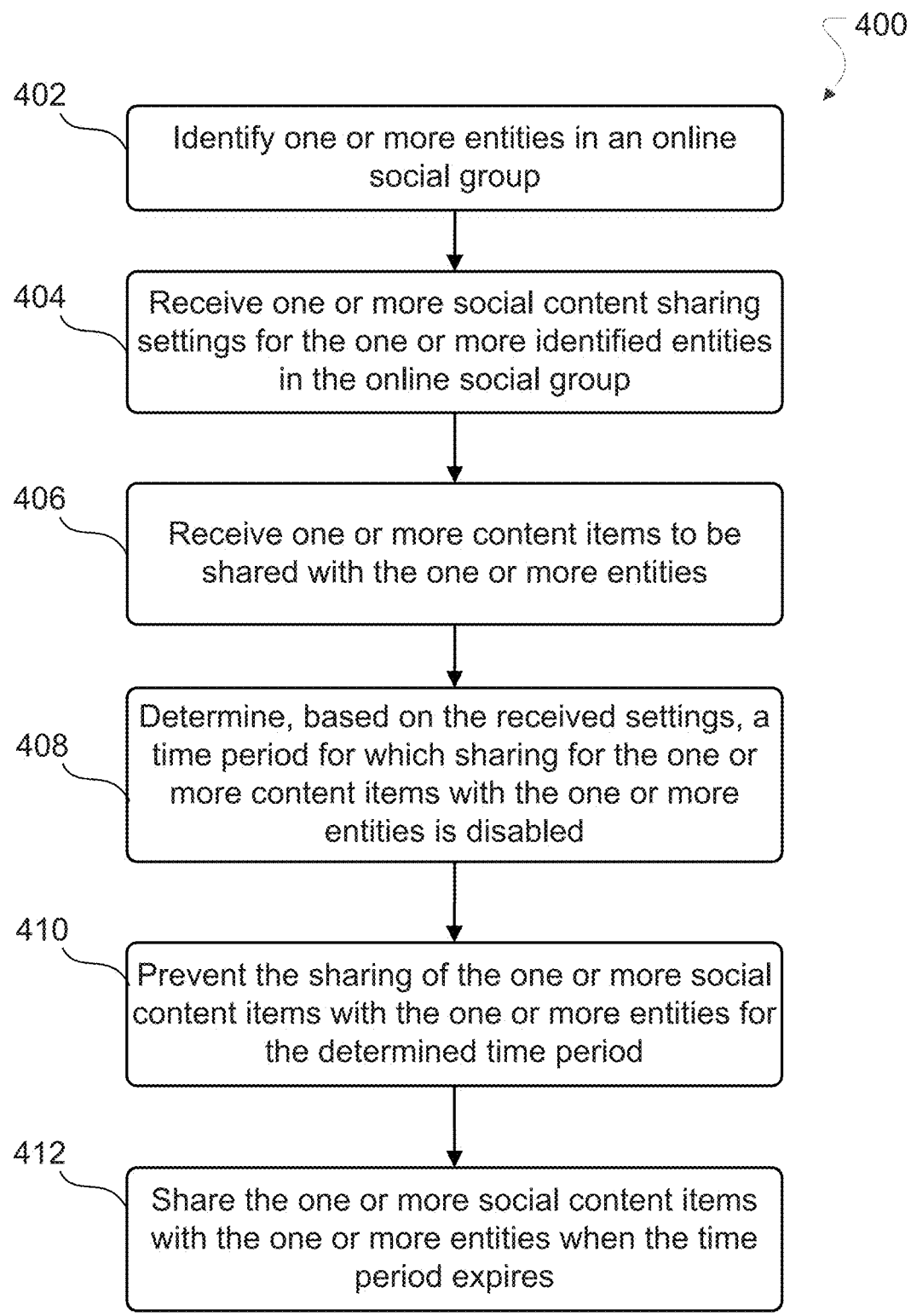
FIG. 4 depicts a flow diagram of a first example process for selectively delaying social content sharing within social networks.

FIG. 4 depicts a flow diagram of a first example process 400 for selectively delaying social content sharing within social networks, according to aspects of the subject technology. For explanatory purposes, example process 400 is described herein with reference to the components of FIGS. 1-3. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, process 400 begins with identifying one or more entities in an online social group (402). In one or more implementations, the one or more entities represent one or more user accounts socially connected to a user account that is initiating a sharing of one or more social content items (e.g., connected to the user account associated with user 176). The one or more entities may be identified, e.g., by way of selection using control 206. In one or more implementations, the one or more entities are identified by way of activating user interface 204 from a control provided in connection with the one or more content items. In this regard, the one or more content items may be associated with the one or more entities (e.g., by way of being posted by an entity).

Process 400 proceeds by receiving one or more social content sharing settings for the one or more identified entities in the online social group (404). In one or more implementations, social sharing controller 132 may identify one or more entities in an online social group and receive one or more social content sharing settings for the one or more identified entities in the online social group. In one example, a user (e.g., user 176) of social networking software application 302 may select, via a user interface 204 of social networking software application 302, one or more icons representing one or more entities (e.g., user accounts associated with friends) and may use the user interface to select social content sharing settings 136 for the one or more identified entities in the online social group.

Server 180 receives one or more content items to be shared with the one or more entities (406). The content items may include endorsements, messages, or postings, etc. provided to or associated with an activity stream with a social network associated with or provided by server 180. In this regard, social sharing controller 132 identifies shared content items in the social network, identifies entities (e.g., users) that would normally receive the shared content items, and determines, based on content sharing settings 136, whether the content items may be shared with the identified entities.

Process 400 proceeds by determining, based on the one or more social content sharing settings, a time period for which sharing of the one or more social content items with the one or more entities is to be prevented (408). The time period may be set within user interface 204 by way of a user selection of one or more controls. In this regard, the time period may be determined by the particular combination of settings related to time that are provided by user interface 204. In one or more implementations, the time period may be determined at the time the content items are received. In this manner, social sharing controller 132 may determine a time period for each content item based on a time that sharing of the content item was initiated and an end time provided by social content sharing settings 136.

Process 400 then proceeds by preventing the sharing of the one or more social content items with the one or more entities for the determined time period (410). Social sharing controller 132 may review social content sharing settings 136 and, based on one or more of social content sharing settings 136, determine a time period (e.g., 24 hours, 1 week, 1 month, etc.) for which sharing of one or more social content items with the one or more entities is to be disabled.

When the determined time period has elapsed, server 180 shares the one or more social content items with the one or more entities (412). In one or more implementations, social sharing controller 132 may include a timer application that measures or tracks time periods, and causes server 180 to share the content items at the end of a corresponding time period for the content items.

Using the subject technology, a user need not have to completely block an entity represented in the user's online social group to prevent certain social content items from being shared with one or more entities in the online social group. Instead, the user may suspend notifications of certain content items from being shared with the one or more entities for a particular time period, thus enhancing the user's social experience.

Figure 5:
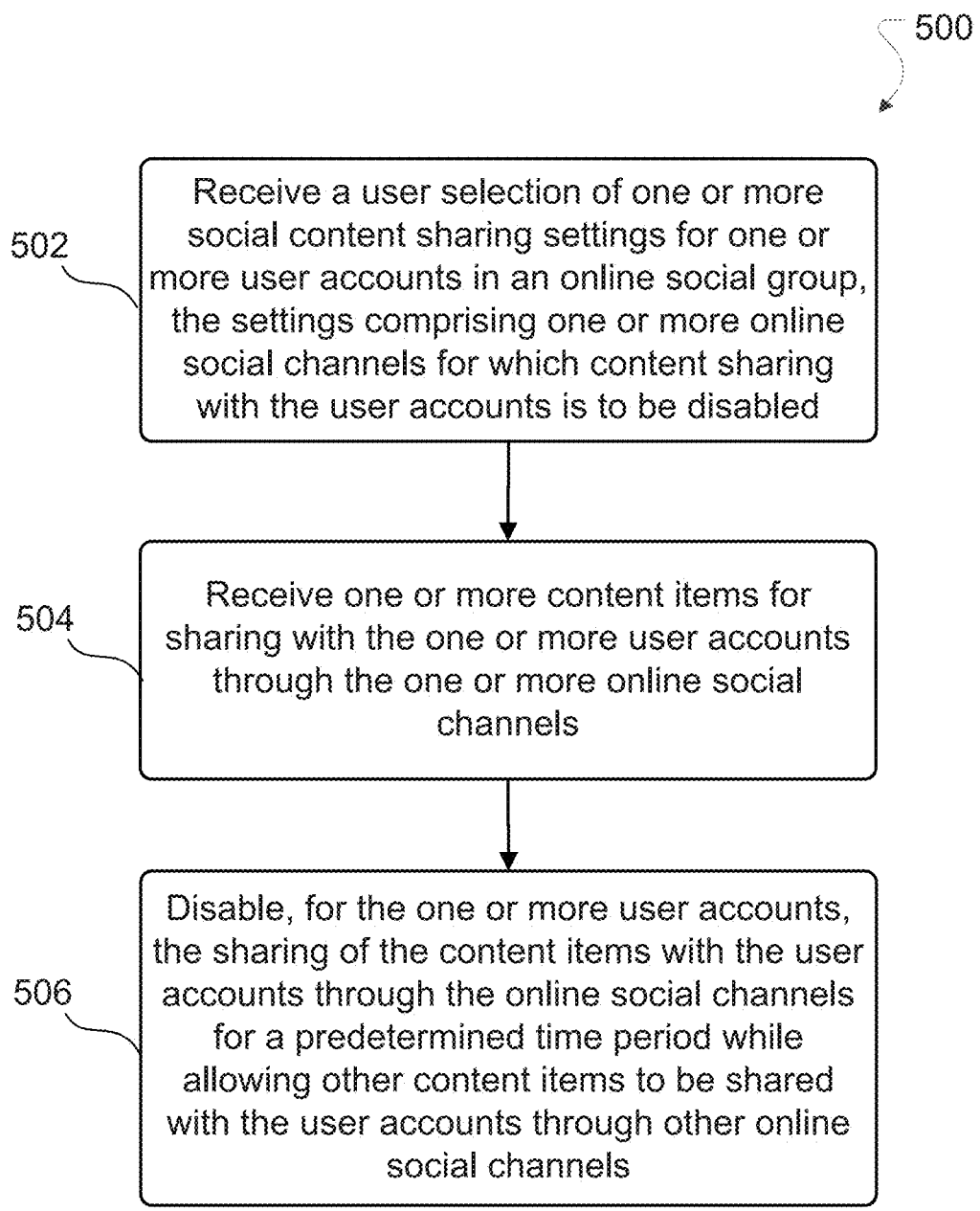
FIG. 5 depicts a flow diagram of a second example process for selectively delaying social content sharing within social networks.

FIG. 5 depicts a flow diagram of a second example process 500 for selectively delaying social content sharing within social networks, according to aspects of the subject technology. For explanatory purposes, example process 500 is described herein with reference to the components of FIGS. 1-3. Further for explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

In the depicted example flow diagram, process 500 begins with receiving, from user interface 204, a user selection of one or more social content sharing settings for one or more user accounts in an online social group, the social content sharing settings including one or more online social channels for which content sharing with the one or more user accounts is to be disabled (502). In one example, a user may select, e.g., one or more icons representing the user accounts from a contact list, from control 206, or from another mechanism allowing the user to select user accounts in the social network. Social sharing controller 132 may identify the user accounts based on the selections and receive one or more social content sharing settings 136 for the one or more user accounts by way of selection at user interface 204.

Server 180 receives one or more content items to be shared with the one or more user accounts through the one or more online social channels (504). As described previously, the contents may include endorsements, messages, or postings, etc. provided to or associated with an activity stream with a social network associated with or provided by server 180. The online social channels may include, e.g., one or more of an online channel for receiving notifications or an online social activity stream.

Process 500 proceeds by disabling, for the one or more user accounts, the sharing of the one or more content items with the one or more user accounts through the one or more online social channels for a predetermined time period while allowing other content items to be shared with the one or more user accounts through other online social channels (506). For example, social sharing controller 132 may disable sharing based on reviewing social content sharing settings 136. When the determined time period has elapsed, process 500 enables sharing of the one or more social content items with the one or more entities via the one or more social channels. In this way, a user need not have to completely block an entity represented in the user's online social group to prevent certain social content items from being shared with one or more entities in the online social group. Instead, the user may suspend notifications from being shared with the one or more entities via particular social channels for a particular time period, thus enhancing the user's social experience.

Figure 6:
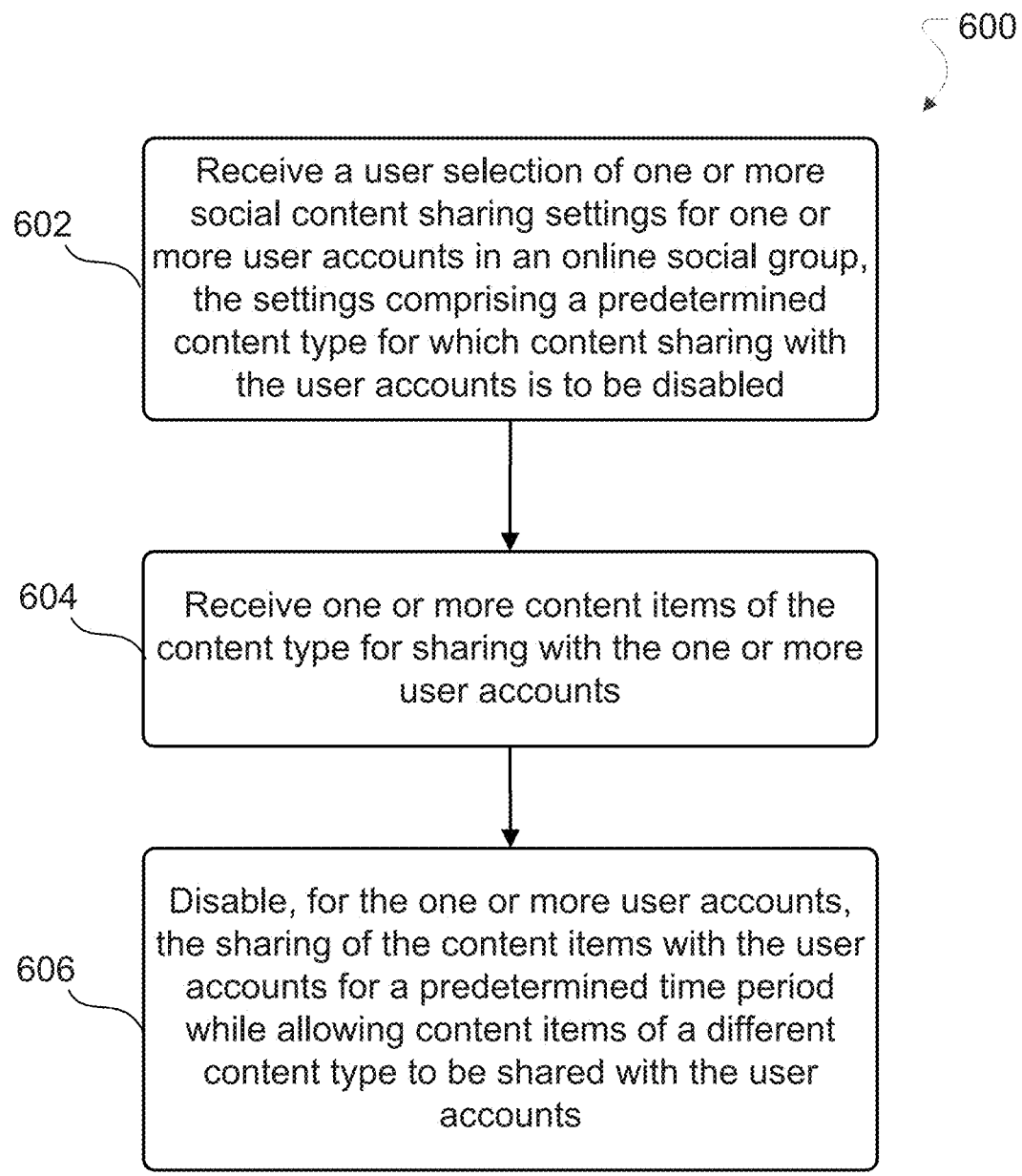
FIG. 6 depicts a flow diagram of a third example process for selectively delaying social content sharing within social networks.

FIG. 6 depicts a flow diagram of a third example process 600 for selectively delaying social content sharing within social networks, according to aspects of the subject technology. For explanatory purposes, example process 600 is described herein with reference to the components of FIGS. 1-3. Further for explanatory purposes, the blocks of example process 600 are described herein as occurring in serial, or linearly. However, multiple blocks of example process 600 may occur in parallel. In addition, the blocks of example process 600 need not be performed in the order shown and/or one or more of the blocks of example process 600 need not be performed.

In the depicted example flow diagram, process 600 begins with receiving, from user interface 204, a user selection of one or more social content sharing settings 136 for one or more user accounts in an online social group, the social content sharing settings comprising a predetermined content type for which content sharing with the one or more user accounts is to be disabled (602). The user selection may be associated with, e.g., a first user account in an online social network, and the online social group is representative of a social graph of relationships between the user account and the one or more user accounts. The predetermined content type may be, e.g., one of an endorsement, an article, or a user message.

Process 600 proceeds by receiving one or more content items of the predetermined content type for sharing with the one or more user accounts (604).

Process 600 proceeds by disabling, for the one or more user accounts, the sharing of the one or more content items with the one or more user accounts for a predetermined time period while allowing other content items of a different content type to be shared with the one or more user accounts (606). When the one or more social content items include the particular type of content, sharing of the one or more content items is suspended with the one or more identified user accounts for the predetermined time period. In one example, such determinations by social sharing controller 132 may be performed based on reviewing social content sharing settings 136. Based on the one or more social content sharing settings 136, sharing of one or more types of content, that is to be disabled with the user account(s), may be determined by social sharing controller 132. For example, based on social content sharing settings 136, social sharing controller 132 may determine that the sharing of video content is to be disabled with the user account(s). In this way, a user need not have to completely block a designated user account within the user's online social group from receiving shared content. Instead, the user may suspend certain types of content from being shared with the one or more entities for a particular time period, thus enhancing the user's social experience.

Additionally or in the alternative, one or more features of process 600 may be combined with one or more features of process 400 or process 500. For example, the social content sharing settings 136 may further include one or more online social channels (e.g., in addition to one or more types of content) for which content sharing with the one or more user accounts is to be disabled. In this regard, disabling the sharing of the one or more content items may include preventing, for the one or more user accounts, the sharing of the one or more content items through the one or more online social channels for the predetermined time period while allowing the one or more content items to be shared with the one or more user accounts through other online social channels.

Many of the features in the above-described example process 400, 500, and 600, and related applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media, by itself, does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Returning to FIG. 1A, in certain aspects, server 180 may be implemented using hardware or a combination of software and hardware, either in a dedicated server, or integrated into another entity, or distributed across multiple entities.

Server 180 includes a bus 124 or other communication mechanism for communicating information, and processor 112 coupled with bus 124 for processing information. Processor 112 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Server 180 can include, in addition to hardware, code that creates an execution environment for the computer program in question, e.g., code that constitutes processor firmware, a protocol stack, a database management system, an operating system, or a combination of one or more of them stored in memory 120. Memory 120 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 124 for storing information and instructions to be executed by processor 112. The processor 112 and the memory 120 can be supplemented by, or incorporated in, special purpose logic circuitry.

The instructions may be stored in the memory 120 and implemented in one or more computer program products, i.e., one or more modules of computer program instructions encoded on a computer readable medium for execution by, or to control the operation of, the server 180, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 120 may also be used for storing temporary variable or other intermediate information during execution of instructions to be executed by processor 112.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Server 180 further includes a data storage device 126 such as a magnetic disk or optical disk, coupled to bus 124 for storing information and instructions. Server 180 may be coupled via input/output module 128 to various devices. The input/output module 128 can be any input/output module. Example input/output modules 128 include data ports such as USB ports. The input/output module 128 is configured to connect to a communications module 118. Example communications modules 118 (e.g., communications module 118 and 238) include networking interface cards, such as Ethernet cards and modems. In certain aspects the input/output module 128 is configured to connect to a plurality of devices, such as an input device 116 and/or an output device 114. Example input devices 114 include a keyboard and a pointing device. e.g., a mouse or a trackball, by which a user can provide input to the server 180. Other kinds of input devices 114 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 116 include display devices, such as a LED (light emitting diode), CRT (cathode ray tube), or LCD (liquid crystal display) screen, for displaying information to the user.

According to one aspect of the present disclosure, server 180 can be implemented using a server 180 in response to processor 112 executing one or more sequences of one or more instructions contained in memory 120. Such instructions may be read into memory 120 from another machine-readable medium, such as data storage device 126. Execution of the sequences of instructions contained in main memory 120 causes processor 112 to perform the process blocks described herein. One or more processors in a multi-processing arrangement may also be employed to execute the sequences of instructions contained in memory 120. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 170) can include, e.g., any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, e.g., any one or more of the following network topologies, including a bus network, a star network, a ring network, a mesh network, a star-bus network, tree or hierarchical network, or the like. The communications modules can be, e.g., modems or Ethernet cards.

Server 180 can be, e.g., and without limitation, a desktop computer, laptop computer, or tablet computer. Server 180 can also be embedded in another device, e.g., and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 112 for execution. Such a medium may take many forms, including, but not limited to, non-volatile media and volatile media. Non-volatile media include, e.g., optical disks, magnetic disks, or flash memory, such as data storage device 126. Volatile media include dynamic memory, such as memory 120. Transmission media include coaxial cables, copper wire, and fiber optics, including the wires that comprise bus 124. Common forms of machine-readable media include, e.g., floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item: rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include." "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method comprising:
   providing a first user interface (UI) comprising a first UI element selectable by a user to specify one or more entities, and a second UI element to specify one or more social content sharing settings to be applied to the one or more entities, the one or more social content sharing settings including a time period, selectable via a third UI element associated with the second UI element, during which delivery of shared content to the one or more entities is to be prevented, wherein the shared content is of one or more predetermined content types that are selectable, via a fourth UI element associated with the second UI element, from a list of content types;
   upon a user selection of the first UI element, identifying a plurality of entities in an online social group and allowing the user to individually select, from the plurality of entities, the one or more entities to whom the one or more social content sharing settings are to be applied;
   identifying one or more content items associated with the time period included in the one or more social content sharing settings specified by the user via the third UI element and the fourth UI element associated with the second UI element;
   determining, based on the received user selection of the one or more entities and the one or more social content sharing settings to be applied to the one or more selected entities, that delivery of the one or more content items for the one or more selected entities is to be prevented during the time period;
   preventing the delivery of the one or more content items to the one or more selected entities during the time period while allowing sharing of the one or more content items with other entities during the time period; and
   displaying the one or more content items with the one or more selected entities when the time period has expired,
   wherein one or more content items comprise an endorsement of user-provided content associated with an activity stream of then or more selected entities, and wherein a display of the endorsement to the one or more selected entities is delayed until the time period expires.

2. The computer-implemented method of claim 1, wherein the one or more selected entities comprise one or more users of an online social network, and wherein the predetermined content type of the one or more content items comprises a user-provided message associated with an activity stream of the online social network, a display of the user-provided message to the one or more users being delayed until the time period expires.

3. The computer-implemented method of claim 1, further comprising;
   providing, during the time period, a visual indication that content shared with the one or more selected entities will not be seen by the one or more selected entities, the visual indication being provided in connection with a representation of the one or more selected entities within the first user interface.

4. The computer-implemented method of claim 1, further comprising:
   providing, to the first user interface, a notification that the one or more content items are being prevented from being shared with a respective entity;
   receiving, from the first user interface, a user-initiated command to share the one or more content items with the respective entity before the time period expires; and
   sharing, in response to the user-initiated command, the one or more content items before the time period expires.

5. The computer-implemented method of claim 1, the method further comprising:
   posting the one or more content items to a webpage associated with a user account, the webpage being remote from the first user interface; and allowing access to the one or more content items by the one or more selected entities, via the webpage while the sharing is prevented during the time period.

6. The computer-implemented method of claim 1, further comprising:
   determining one or more notification settings associated with a user account; and
   selectively providing notifications associated with the one or more selected entities to the user account based on the notification settings while the sharing is prevented during the time period.

7. The computer-implemented method of claim 1, wherein the social content sharing settings comprise one or more online social channels for which content sharing with the one or more selected entities is to be prevented, and wherein preventing the sharing of the one or more content items comprises:
   preventing, for the one or more selected entities, the sharing of the one or more content items through the one or more online social channels for the time period while allowing the one or more content items to be shared with the one or more selected entities through other online social channels.

8. The computer-implemented method of claim 1, wherein the user selection is associated with a first user account in an online social network, and the online social group is representative of a social graph of relationships between the first user account and other user accounts in the online social network, the other user accounts comprising the one or more selected entities.

9. A computer-implemented method, comprising:
   providing a first user interface (UI) comprising a first UI element selectable by a user to specify one or more entities, and a second UI element to specify one or more social content sharing settings to be applied to the one or more entities in an online social group, the social content sharing setting comprising one or more online social channels for which content sharing with the one or more entities is to be disabled and a time period selectable via a third UI element associated with the second UI element, during which delivery of shared content to the one or more entities is to be delayed, wherein the shared content is of one or more predetermined content types that are selectable, via a fourth UI element associated with the second UI element, from a list of content types;
   upon a user selection of the first UI element, identifying a plurality of entities in the online social group and allowing the user to individually select, from the plurality of entities, the one or more entities to whom the one or more social content sharing settings are to be applied;
   receiving user input identifying one or more content items for sharing with the one or more selected entities through the one or more online social channels; and
   disabling, for the one or more selected entities based on the received user selection, delivery of the one or more content items to the one or more selected entities through the one or more online social channels during the time period while allowing other content items to be shared with the one or more selected entities through other online social channels, wherein the one or more content items are prevented from being displayed to the one or more selected entities during the time period while being provided for display to one or more other entities, wherein one or more content items comprise an endorsement of user-provided content associated with an activity stream of the one or more selected entities, and wherein a display of the endorsement to the one or more selected entities is delayed until the time period expires.

10. The computer-implemented method of claim 9, wherein the online social channels include one or more of an online channel for receiving notifications or an online social activity stream.

11. The computer-implemented method of claim 9, wherein the one or more social channels comprises an activity stream associated with the one or more selected entities, and wherein the predetermined content type of the one or more content items comprises a user-provided message for the activity stream, a display of the user-provided message being delayed for the one or more selected entities until the time period expires.

12. The computer-implemented method of claim 9, further comprising:
   providing, during the time period, a visual indication that content shared with the one or more selected entities through the one or more social channels will not be seen by the one or more selected entities, the visual indication being provided in connection with a representation of the one or more selected entities within the first user interface.

13. The computer-implemented method of claim 9, further comprising:
   providing, to the first user interface, a notification that the one or more content items are being prevented from being shared with a respective entity;
   receiving, from the first user interface, a user-initiated command to share the one or more content items with the respective entity before the time period expires; and
   sharing, in response to the user-initiated command, the one or more content items through the one or more social channels before the time period expires.

14. The computer-implemented method of claim 9, further comprising:
   determining one or more notification settings associated with the one or more selected entities; and
   selectively providing, based on the one or more notification settings, notifications related to the sharing of the one or more content items to the user who provided the one or more content items for sharing with the one or more selected entities, while the sharing is prevented during the time period.

15. A non-transitory computer-readable storage medium comprising instructions, which, when executed by a processor, cause the processor to perform operations comprising:
   providing a first user interface (UI) comprising a first UI element selectable by a user to specify one or more entities and a second UI element to specify one or more social content sharing settings to be applied to the one or more entities in an online social group, the one or more social content sharing settings comprising a time period selectable via a third UI element associated with the second UI element, during which content sharing by the user with the one or more entities and delivery of the shared content to the one or more entities is to be prevented for a predetermined content type, wherein one or more predetermined content types that are selectable, via a fourth UI element associated with the second UI element, from a list of content types, wherein the shared content is of one or more predetermined content types that are selectable, via a fourth UI element associated with the second UI element, from a list of content types;

upon a user selection of the first UI element, identifying a plurality of entities in the online social group and allowing the user to individually select, from the plurality of entities, the one or more entities to whom the one or more social content sharing settings are to be applied;

receiving user input identifying one or more content items of the predetermined content type for sharing with the one or more selected entities; and disabling, for the one or more selected entities based on the received user selection, delivery of the one or more content items to the one or more selected entities during the time period while allowing other content items of a different content type to be shared with the one or more selected entities, wherein the one or more content items are prevented from being displayed to the one or more selected entities during the time period while being provided for display to one or more other entities, wherein one or more content items comprise an endorsement of user-provided content associated with an activity stream of the one or more selected entities, and wherein a display of the endorsement to the one or more selected entities is delayed until the time period expires.

16. The non-transitory computer-readable storage medium of claim 15, wherein the user selection is associated with a first user account in an online social network, and the online social group is representative of a social graph of relationships between the first user account and the one or more selected entities.

17. The non-transitory computer-readable storage medium of claim 15, wherein the predetermined content type is one of an article, a user message, a user post, an application update, or all social activities of the user.

18. The non-transitory computer-readable storage medium of claim 15, wherein the social content sharing settings comprise one or more online social channels for which content sharing with the one or more selected entities is to be disabled, and wherein disabling the sharing of the one or more content items comprises:

preventing, for the one or more selected entities, the sharing of the one or more content items through the one or more online social channels for the time period while allowing the one or more content items to be shared with the one or more selected entities through other online social channels.

* * * * *